United States Patent
Chaudhari et al.

(10) Patent No.: US 12,301,005 B2
(45) Date of Patent: May 13, 2025

(54) SYSTEM AND METHOD FOR CONTROLLING AN ACTIVE HARMONIC FILTER IN AN INVERTER-BASED RESOURCE

(71) Applicant: General Electric Renovables Espana, S.L., Barcelona (ES)

(72) Inventors: Pushkar Chandrakant Chaudhari, Bengaluru (IN); Kapil Jha, Bengaluru (IN); Robert Gregory Wagoner, Roanoke, VA (US); Werner Gerhard Barton, Rheine (DE); Saurabh Shukla, Bengaluru (IN); Arvind Kumar Tiwari, Niskayuna, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 126 days.

(21) Appl. No.: 18/318,833

(22) Filed: May 17, 2023

(65) Prior Publication Data
US 2024/0388091 A1 Nov. 21, 2024

(51) Int. Cl.
*H02J 3/18* (2006.01)
*H02J 3/01* (2006.01)
*H02J 3/50* (2006.01)

(52) U.S. Cl.
CPC .............. *H02J 3/1842* (2013.01); *H02J 3/01* (2013.01); *H02J 3/50* (2013.01); *H02J 2300/28* (2020.01)

(58) Field of Classification Search
CPC .... H02J 3/1842; H02J 3/01; H02J 3/50; H02J 2300/28
See application file for complete search history.

(56) References Cited

U.S. PATENT DOCUMENTS

| | | |
|---|---|---|
| 5,731,965 A | 3/1998 | Cheng et al. |
| 2002/0136036 A1 | 9/2002 | Hugget et al. |
| 2021/0396212 A1* | 12/2021 | Larsen ................... F03D 9/257 |

FOREIGN PATENT DOCUMENTS

JP 2015/162998 A 9/2015

OTHER PUBLICATIONS

European Search Report and Opinion Corresponding to EP24176067 on Oct. 14, 2024.

(Continued)

*Primary Examiner* — Daniel Cavallari
*Assistant Examiner* — Thai H Tran
(74) *Attorney, Agent, or Firm* — Dority & Manning, P.A.

(57) ABSTRACT

A method for controlling an active harmonic filter of an inverter-based resource includes receiving, via a maximum compensation tracker module, a grid feedback signal, determining, via the maximum compensation tracker module, a phase shift signal based, at least in part, on the grid feedback signal, applying, via the maximum compensation tracker module, a phase shift offset signal to the phase shift signal to obtain a modified phase shift signal, determining, via the maximum compensation tracker module, a voltage reference signal for the active harmonic filter based, at least in part, on the grid feedback signal and the modified phase shift signal; and controlling, via the maximum compensation tracker module, the active harmonic filter using the voltage reference signal, wherein the phase shift offset signal ensures that the active harmonic filter injects a current substantially out of phase of a targeted harmonic.

14 Claims, 8 Drawing Sheets

(56) References Cited

OTHER PUBLICATIONS

El Kachani et al., Nonlinear Model Predictive Control Applied to a DFIG-Based Wind Turbine with a Shunt APF, XP033124017, 2016 International Renewable and Sustainable Energy Conference (IRSEC), Marrakech, Morocco, 2016, pp. 369-375. https://ieeexplore.ieee.org/document/7983962.

* cited by examiner

SYSTEM AND METHOD FOR CONTROLLING AN ACTIVE HARMONIC FILTER IN AN INVERTER-BASED RESOURCE

FIELD

The present disclosure relates generally to inverter-based resources, such as wind turbines, and more particular to a system and method for controlling an active harmonic filter in an inverter-based resource.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to an electrical grid via a grid breaker. Thus, the turbine transformer steps up the voltage amplitude of the electrical power such that the transformed electrical power may be further transmitted to the electrical grid.

In many wind turbines, the generator rotor may be electrically coupled to a bi-directional power converter that includes a rotor side converter joined to a line side converter via a regulated DC link. More specifically, some wind turbines, such as wind-driven doubly fed induction generator (DFIG) systems or full power conversion systems, may include a power converter with an AC-DC-AC topology. In such systems, the generator stator is separately connected to the electrical grid via a main transformer.

In certain instances, however, such systems can generate turbine harmonics that need to be controlled and/or reduced as one of the requirements from various grid codes is compliance of current and voltage harmonics at the output of the wind turbine. The primary sources of harmonics in DFIG-based wind turbine systems are the rotor-side and the line-side converters. The harmonics in the rotor-side converter primarily contribute to turbine harmonics via the stator current. The stator and line currents become combined together to generate turbine harmonics (with or without the main transformer).

Thus, in a DFIG system, where the stator is isolated from the power converter, a passive filter is generally provided between the stator and the grid to allow the stator voltage to be different from the converter voltage. Though such filters can reduce harmonics supplied from the DFIG to the electrical grid, they do not provide much flexibility with varying operating conditions.

Thus, the present disclosure is directed to systems and methods for controlling an active harmonic filter in an inverter-based resource, such as a wind turbine, using a maximum compensation tracker for phase offset control for the active harmonic filter.

BRIEF DESCRIPTION

Aspects and advantages of the disclosure will be set forth in part in the following description, or may be obvious from the description, or may be learned through practice of the disclosure.

In an aspect, the present disclosure is directed to a method for controlling an active harmonic filter of an inverter-based resource. The method includes receiving, via a maximum compensation tracker module, a grid feedback signal. Further, the method includes determining, via the maximum compensation tracker module, a phase shift signal based, at least in part, on the grid feedback signal. Moreover, the method includes applying, via the maximum compensation tracker module, a phase shift offset signal to the phase shift signal to obtain a modified phase shift signal. In addition, the method includes determining, via the maximum compensation tracker module, a voltage reference signal for the active harmonic filter based, at least in part, on the grid feedback signal and the modified phase shift signal. Thus, the method includes controlling, via the maximum compensation tracker module, the active harmonic filter using the voltage reference signal, wherein the phase shift offset signal ensures that the active harmonic filter injects a current substantially out of phase of a targeted harmonic.

In another aspect, the present disclosure is directed to a wind turbine power system connected to an electrical grid. The wind turbine power system includes a power converter having a rotor-side converter and a line-side converter, a generator having a rotor and a stator, an active harmonic filter coupled between the generator and the electrical grid, and a controller for controlling the wind turbine power system. The controller includes a maximum compensation tracker module. The maximum compensation tracker module is configured to perform a plurality of operations, including but not limited to receiving a grid feedback signal, determining a phase shift signal based, at least in part, on the grid feedback signal, applying a phase shift offset signal to the phase shift signal to obtain a modified phase shift signal, determining a voltage reference signal for the active harmonic filter based, at least in part, on the grid feedback signal and the modified phase shift signal, and controlling the active harmonic filter using the voltage reference signal, wherein the phase shift offset signal ensures that the active harmonic filter injects a current substantially out of phase of a targeted harmonic.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
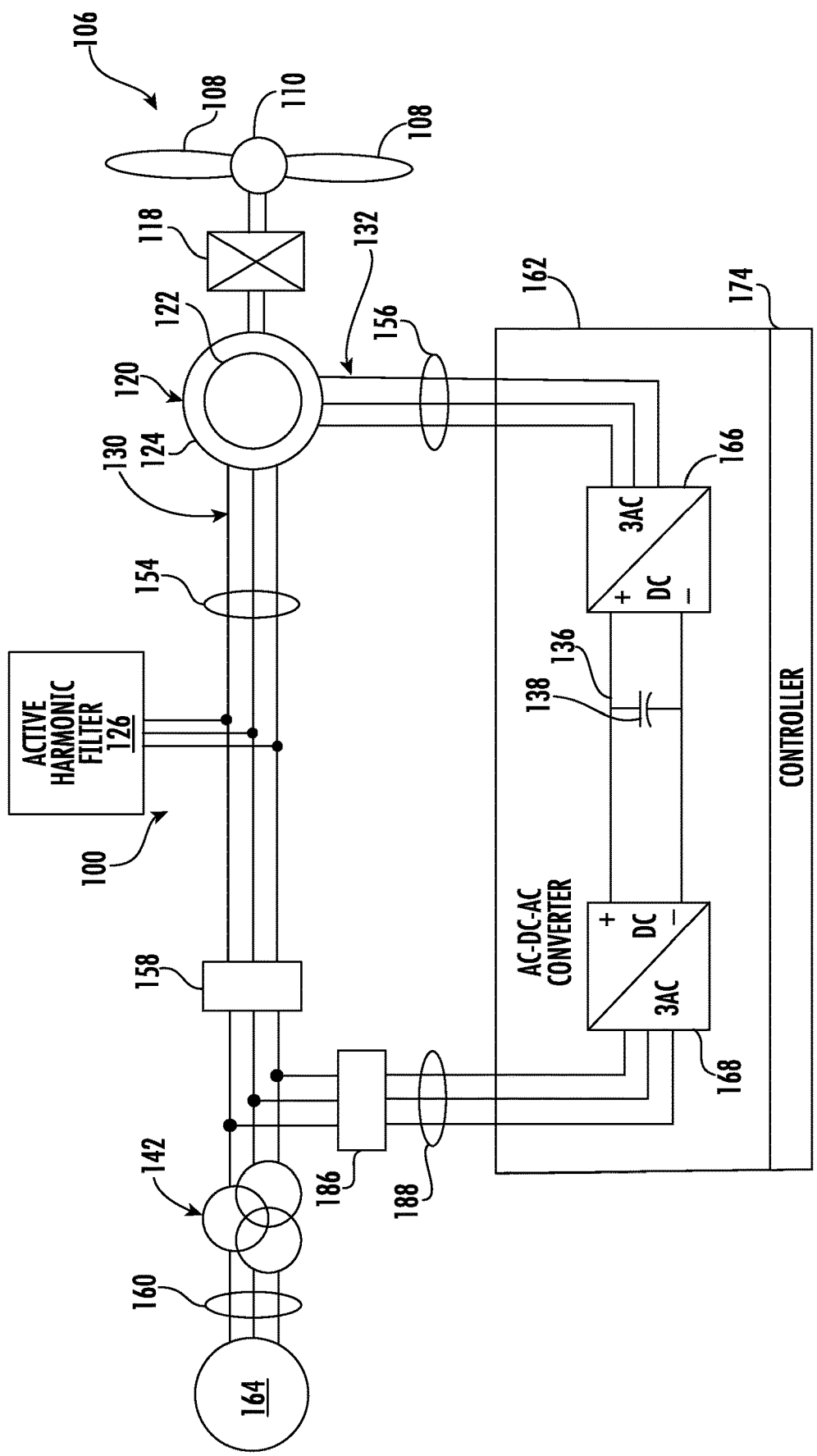
FIG. 1 illustrates one embodiment of an example renewable energy power system according to the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods that use a maximum compensation tracker to optimize the phase offset in the control of an active harmonic filter. Thus, in an embodiment, the maximum compensation tracker ensures that the active harmonic filter is injecting a current nearly out of phase of the targeted harmonic. This results in maximum compensation per unit ampere for the active harmonic filter. An advantage of the present disclosure is that the compensation performance of active harmonic filter is improved, which contributes to the harmonic compliance of the wind turbines employing the control schemes described herein.

Referring now to the drawings, FIG. 1 illustrates a schematic diagram of a wind turbine power system 100 according to an embodiment of the present disclosure. In particular, as shown, the wind turbine power system 100 includes a rotor 106 having a plurality of rotor blades 108 coupled to a rotatable hub 110, and together define a propeller. The propeller is coupled to an optional gearbox 118, which is, in turn, coupled to a generator 120 having a rotor 122 and a stator 124. In accordance with aspects of the present disclosure, the generator 120 may be any suitable generator, including for example, a doubly fed induction generator (DFIG). The generator 120 is typically coupled to a stator bus 154 and a power converter 162 via a rotor bus 156. The stator bus 154 provides an output multiphase power (e.g., three-phase power) from a stator of the generator 120 and the rotor bus 156 provides an output multiphase power (e.g., three-phase power) of a rotor of the generator 120.

The power converter 162 includes a rotor-side converter 166 coupled to a line-side converter 168. The generator 120 is coupled to the rotor-side converter 166 via the rotor bus 156. The line-side converter 168 is coupled to a line-side bus 188. Further, as shown, the stator bus 154 may be directly connected to the line-side bus 188. In example configurations, the rotor-side converter 166 and the line-side converter 168 are configured for normal operating mode in a three-phase, PWM arrangement using insulated gate bipolar transistor (IGBT) switching elements, which are discussed in more detail herein. The rotor-side converter 166 and the line-side converter 168 can be coupled via a DC link 136 across which is the DC link capacitor 138. In alternative embodiments, the stator bus 154 and the power converter 162 may be connected to separate isolated windings of a transformer (not shown), i.e., at the junction of the generator breaker 158 and the converter breaker 186.

In addition, as shown in FIG. 1, the wind turbine power system 100 further includes an active harmonic filter 126, e.g., coupled between the generator 120 and the electrical grid 164. Thus, as will be further explained herein, the present disclosure is directed to systems and methods for controlling the active harmonic filter 126 using a maximum compensation tracker module for phase offset control.

The power converter 162 can be coupled to a controller 174 to control the operation of the rotor-side converter 166 and the line-side converter 168 and other aspects of the wind turbine power system 100. For example, as shown particularly in FIG. 2, the controller 174 can include any number of control devices. In one implementation, for example, the controller 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g., pulse width modulation commands) to the switching elements of the power converter 162 and other aspects of the wind turbine power system 100.

Figure 2:
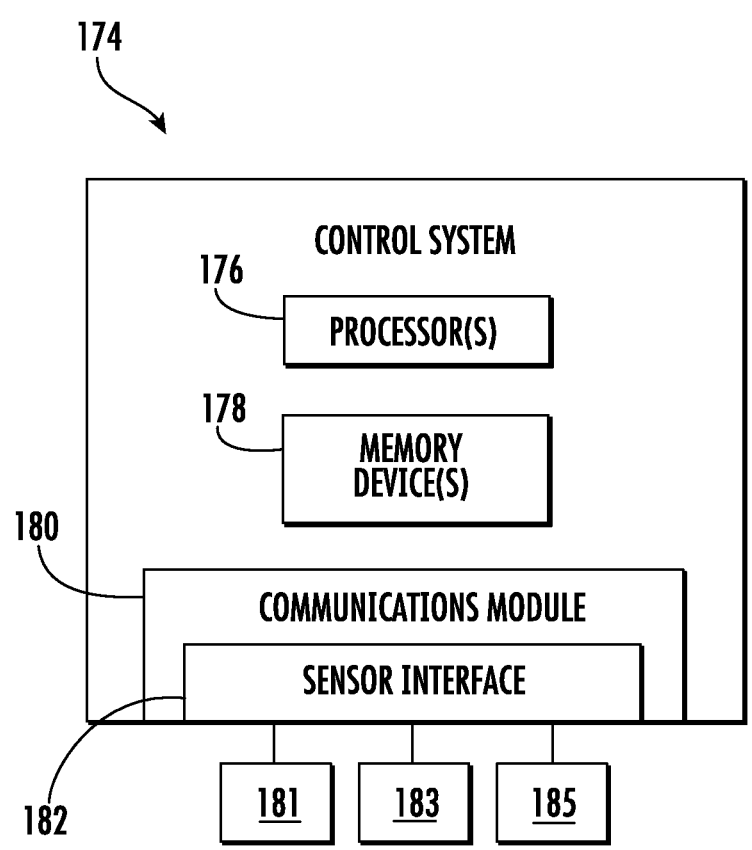
FIG. 2 illustrates a block diagram of one embodiment of a controller suitable for use with the renewable energy power system shown in FIG. 1.

Additionally, the controller 174 may also include a communications module 180 to facilitate communications between the controller 174 and the various components of the wind turbine power system 100, e.g., any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g., sensors 181, 183, 185) may be communicatively coupled to the communications module 180 using any suitable means. For example, as shown in FIG. 2, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controller 174 to perform the various functions as described herein.

In operation, alternating current power generated at the generator 120 by rotation of the rotor 106 is provided via a dual path to a grid bus 160 and ultimately to an electrical grid 164. The dual paths are defined by a generator power path 130 and a converter power path 132. On the converter power path 132, sinusoidal multi-phase (e.g., three-phase) alternating current (AC) power is provided to the power converter 162 via the rotor bus 156.

The rotor-side power converter 166 converts the AC power provided from the rotor bus 156 into direct current (DC) power and provides the DC power to the DC link 136. Switching elements (e.g., IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 164. In particular, switching elements (e.g., IGBTs) used in bridge circuits of the line-side power converter 168 can be modulated to convert the DC power on the DC link 136 into AC power on the line-side bus 188. The AC power from the power converter 162 can be combined with the power from the stator of the generator 120 to provide multi-phase power (e.g., three-phase power) having a frequency maintained substantially at the frequency of the electrical grid 164 (e.g., 50 Hz/60 Hz). Further, as shown, the associated electrical power can be transmitted to a main transformer 142 that is typically connected to the electrical grid 164. Thus, the main transformer 142 steps up the voltage amplitude of the electrical power such that the transformed electrical power may be further transmitted to the electrical grid 164.

Various circuit breakers and switches, such as a generator breaker 158 and converter breaker 186, can be included in the wind turbine power system 100 to connect or disconnect corresponding buses, for example, when current flow is excessive and can damage components of the wind turbine power system 100 or for other operational considerations. Additional protection components can also be included in the wind turbine power system 100.

The power converter 162 can receive control signals from, for instance, the controller 174. The control signals can be based, among other things, on sensed conditions or operating characteristics of the wind turbine system 100. Typically, the control signals provide for control of the operation of the power converter 162. For example, feedback in the form of sensed speed of the generator 120 can be used to control the conversion of the output power from the rotor bus 156 to maintain a proper and balanced multi-phase (e.g., three-phase) power supply. Other feedback from other sensors can also be used by the controller 174 to control the power converter 162, including, for example, stator and rotor bus voltages and current feedbacks. Using the various forms of feedback information, switching control signals (e.g., gate timing commands for IGBTs), stator synchronizing control signals, and circuit breaker signals can be generated.

Figure 3:
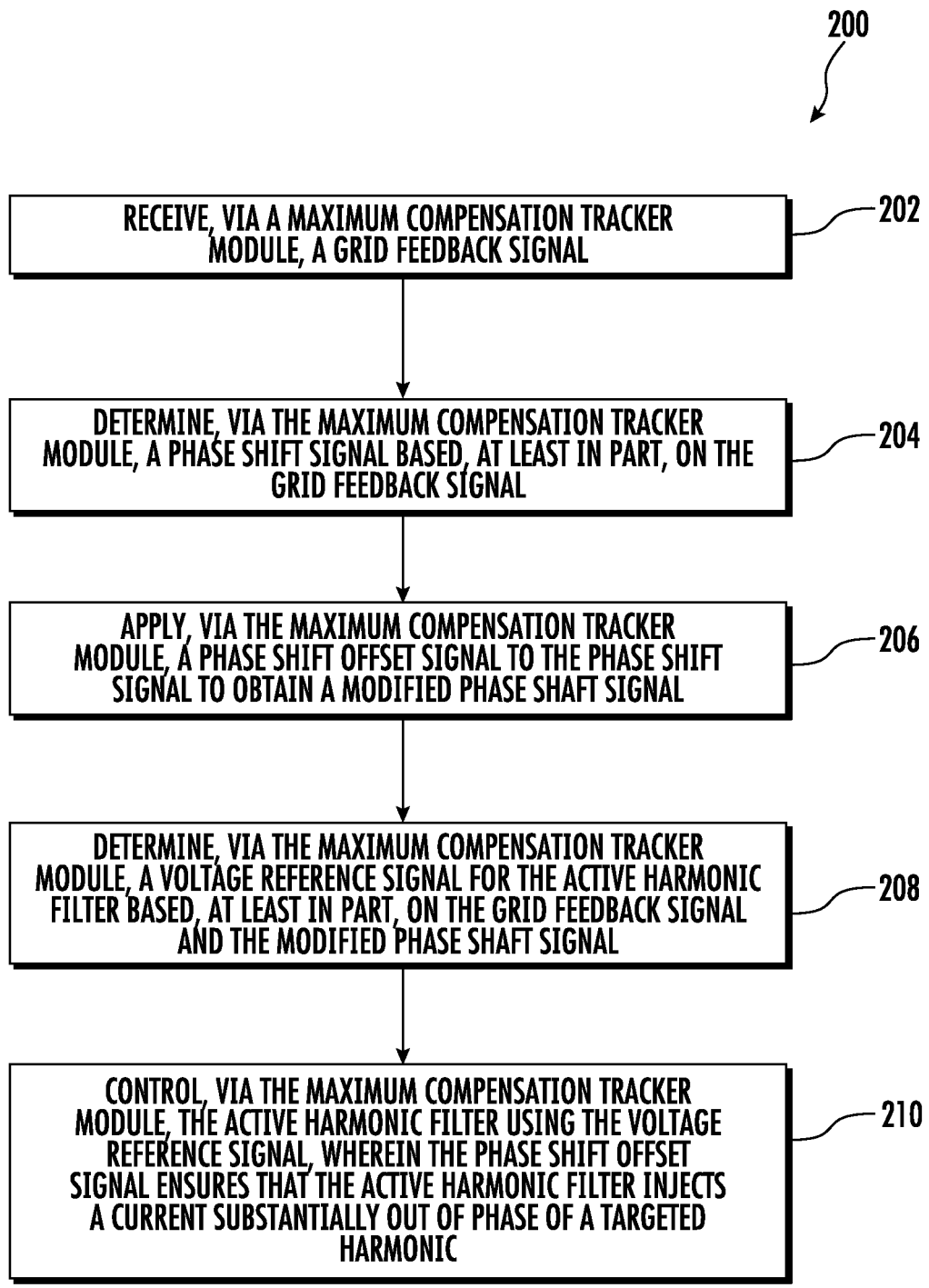
FIG. 3 illustrates a flow diagram of a method for controlling an active harmonic filter of an inverter-based resource according to the present disclosure.

Referring now to FIG. 3, a flow diagram of one embodiment of a method 200 for controlling an active harmonic filter of an inverter-based resource, such as a wind turbine power system, according to the present disclosure is illustrated. In general, the method 200 described herein generally applies to the wind turbine power system 100 described above. However, it should be appreciated that the disclosed method 200 may be implemented using any other suitable power system. Further, FIG. 3 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (202), the method 200 includes receiving, via a maximum compensation tracker module, a grid feedback signal. As shown at (204), the method 200 includes determining, via the maximum compensation tracker module, a phase shift signal based, at least in part, on the grid feedback signal. As shown at (206), the method 200 includes applying, via the maximum compensation tracker module, a phase shift offset signal to the phase shift signal to obtain a modified phase shift signal. As shown at (208), the method 200 includes determining, via the maximum compensation tracker module, a voltage reference signal for the active harmonic filter based, at least in part, on the grid feedback signal and the modified phase shift signal. As shown at (210), the method 200 includes controlling, via the maximum compensation tracker module, the active harmonic filter using the voltage reference signal, wherein the phase shift offset signal ensures that the active harmonic filter injects a current substantially out of phase of a targeted harmonic.

Figure 4:
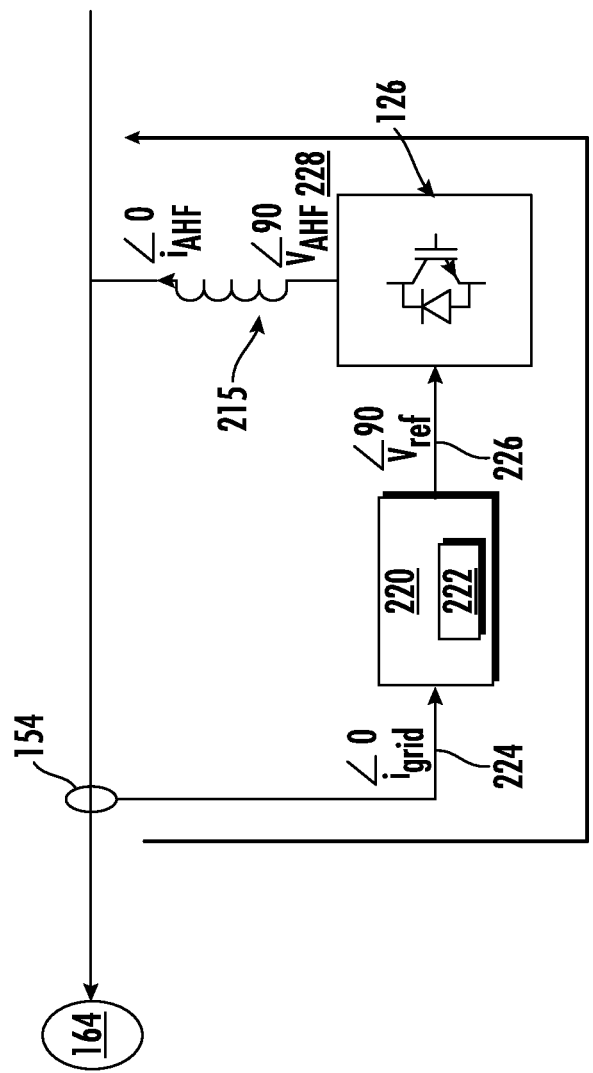
FIG. 4 illustrates a simplified schematic diagram of an embodiment of an active harmonic filter coupled to a stator bus according to the present disclosure, particularly illustrating a phase change that ideally occurs in the feedback as it passes through the active harmonic filter.
Figure 8:
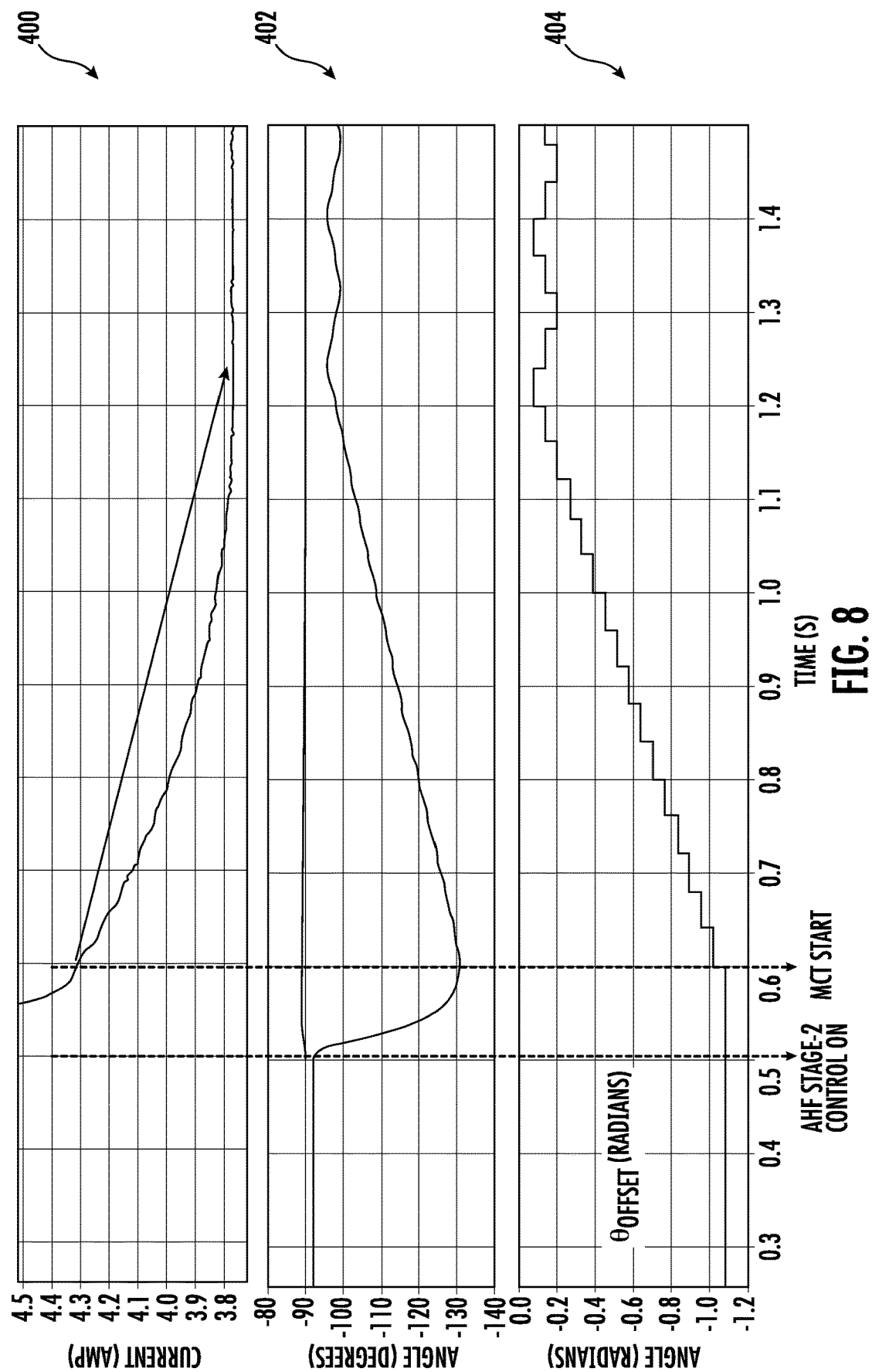
FIG. 8 illustrates various graphs of current in amperes, angle in degrees, and angle in radians versus time to illustrate maximum compensation tracking for an active harmonic filter of an inverter-based resource according to the present disclosure.

The method 200 of FIG. 3 can be better understand with respect to FIGS. 4 and 8. In particular, FIG. 4 illustrates a simplified schematic diagram of an embodiment of the active harmonic filter 126 coupled to the stator bus 154 according to the present disclosure, particularly illustrating a phase change that ideally occurs in the feedback as it passes through the active harmonic filter 126. Further, as shown, the active harmonic filter 126 is communicatively coupled to a controller 220 having a maximum compensation tracker module 222. Thus, as shown, the maximum compensation tracker module 222 receives a grid feedback signal 224 (e.g., igrid) and generates a voltage reference signal 226 (e.g., Vref) for the active harmonic filter 126. The active harmonic filter 126 then provides a voltage harmonic signal 228 for an interconnecting inductor 215, i.e., to reduce harmonics thereof.

Figure 5:
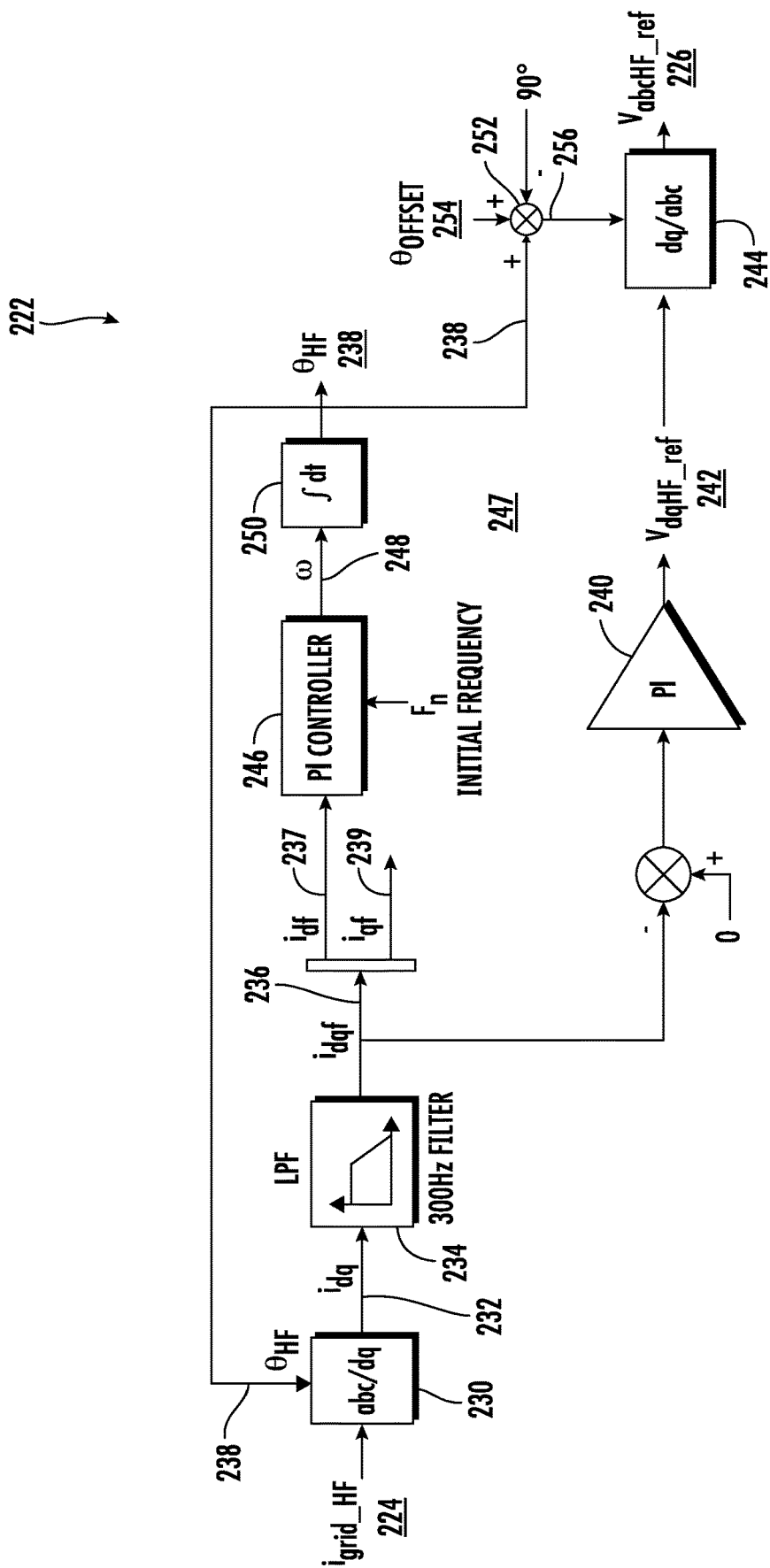
FIG. 5 illustrates a schematic diagram of a maximum compensation tracker module for an active harmonic filter according to the present disclosure.

Referring now to FIG. 5, a schematic diagram of the maximum compensation tracker module 222 for the active harmonic filter 126 according to the present disclosure is illustrated. As shown, the maximum compensation tracker module 222 receives the grid feedback signal 224. In particular, as shown, the grid feedback signal 224 may include a voltage feedback, a current feedback, a frequency feedback, and/or combinations thereof.

Moreover, as shown at 230, the maximum compensation tracker module 222 is configured to rotate the grid feedback signal 224 from an abc reference frame to a dq reference frame to obtain a rotated dq feedback signal 232, e.g., using a phase shift signal 238 (e.g., θHF). In addition, as shown at 234, the maximum compensation tracker module 222 is configured to filter the rotated dq feedback signal to obtain a filtered dq feedback signal 236. In an embodiment, for example, the filter may be a low-pass filter (LPF).

Thus, as shown, the maximum compensation tracker module 222 is configured to determine the voltage reference signal 226 (e.g., Vref or VabcHF_ref) for the active harmonic filter 126 by applying a gain 240 to the filtered dq feedback signal 236 to determine a dq voltage reference signal 242 and, as shown at 244, rotating the dq voltage reference signal 242 from the dq reference frame back to the abc reference frame to obtain an abc voltage reference signal 226 (VabcHF_ref), which as mentioned, is synonymous with the voltage reference signal 226 (e.g., Vref).

Still referring to FIG. 5, the maximum compensation tracker module 222 is further configured to determine the phase shift signal 238 by determining, via a proportional integral controller 246, an angular frequency 248 based on an initial frequency signal 247 and a d component 237 (e.g., $i_{df}$) of the filtered dq feedback signal 236, and integrating, via integrator 250, the angular frequency 248 to obtain the phase shift signal 238. The q component of the filtered dq feedback signal 236 is represented in FIG. 5 as $i_{qf}$. Accordingly, as mentioned, the phase shift signal 238 can be used at 230 to rotate the grid feedback signal 224 from the abc reference frame to the dq reference frame. In addition, as shown at 252, the phase shift signal 238 can be used by the maximum compensation tracker module 222 to determine an optimal value 256 of an phase shift offset signal 254 for maximum harmonic compensation per unit ampere for the active harmonic filter 126.

Figure 6:
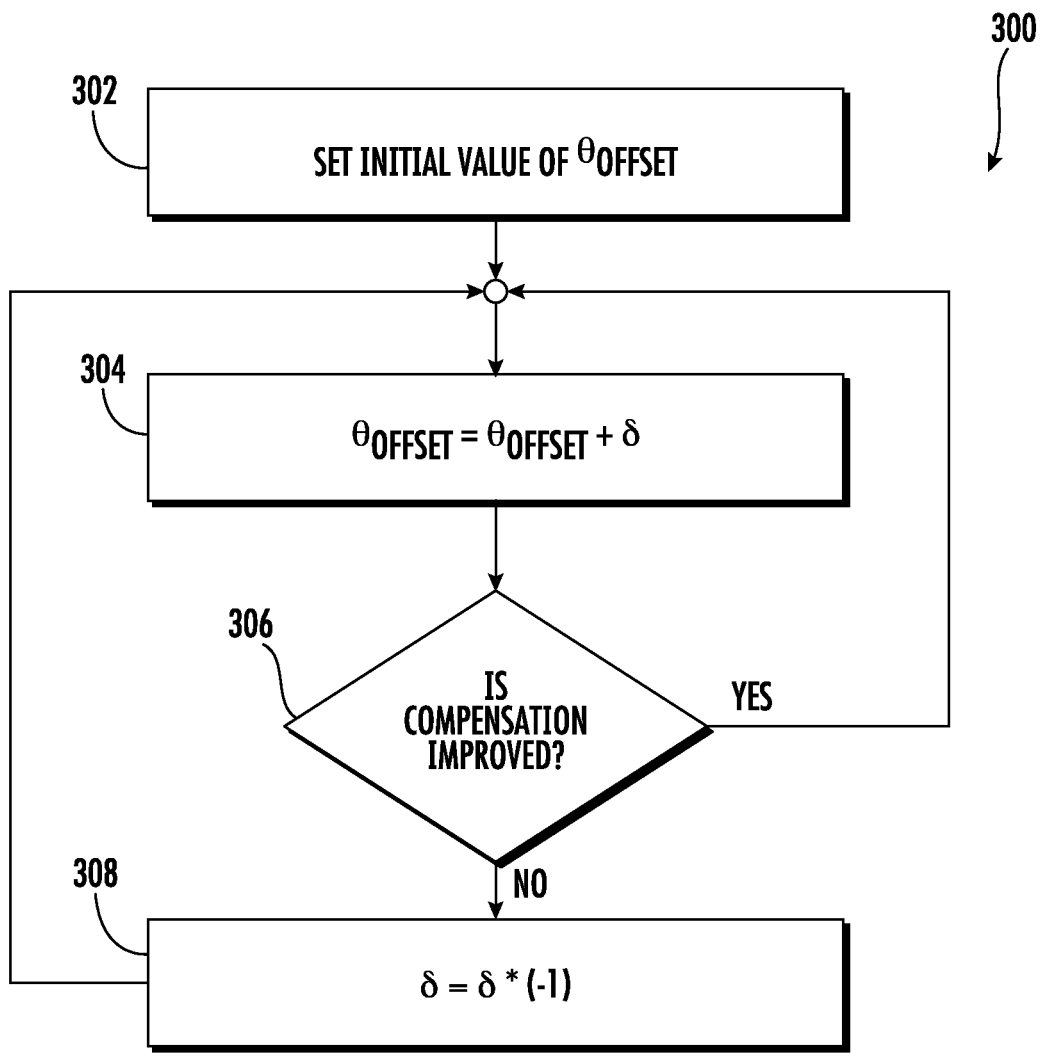
FIG. 6 illustrates a flow diagram of an algorithm for determining a phase shift offset signal for an active harmonic filter of an inverter-based resource according to the present disclosure.

Referring now to FIG. 6, a flow diagram of an algorithm 300 for determining the phase shift offset signal 254 for the active harmonic filter 126 according to the present disclosure is illustrated. In particular embodiments, as shown at 302, in FIG. 6, the maximum compensation tracker module 222 is configured to determine the optimal value 256 of the phase shift offset signal 254 (e.g., θoffset) for maximum harmonic compensation per unit ampere for the active harmonic filter by setting a default value for the phase shift offset signal. Furthermore, as shown at 304, the maximum compensation tracker module 222 is configured to disturb the phase shift offset signal by an offset parameter δ. Moreover, as shown at 306, the maximum compensation tracker module 222 is configured check whether a harmonic compensation of the active harmonic filter 126 has improved, e.g., using a discrete Fourier transform. If the harmonic compensation has improved, the algorithm 300 is configured to maintain the phase shift offset signal 254 at the default value. However, as shown at 308, if the harmonic compensation has not improved, the algorithm 300 is configured to incrementally change the offset parameter δ by a certain amount to obtain a revised offset parameter (e.g., as represented by δ=δ*(−1)). Further, as shown, the algorithm 300 is further configured to disturb the phase shift offset signal 254 by the revised offset parameter and recheck the harmonic compensation of the active harmonic filter 126 thereafter.

Figure 7:
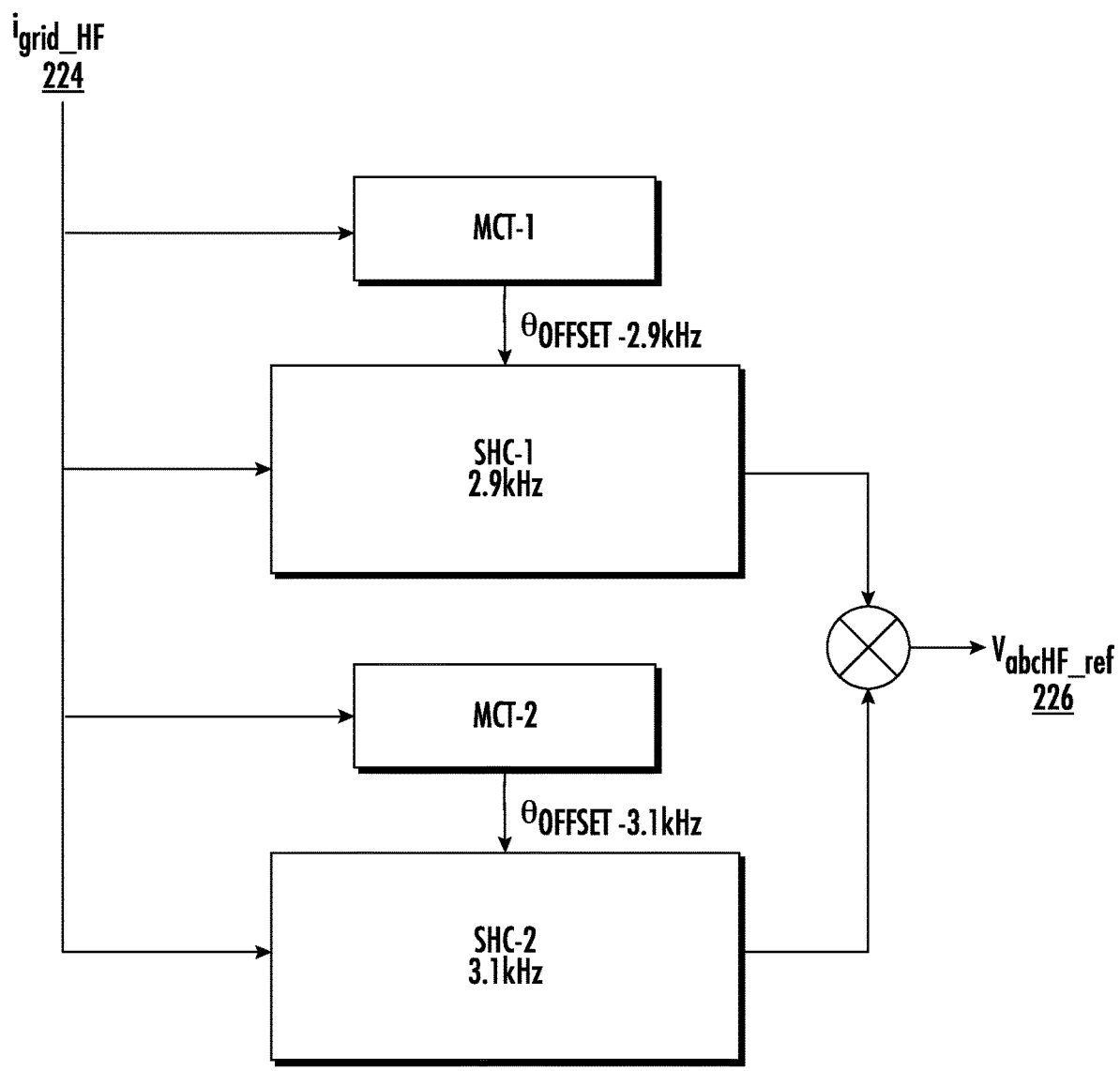
FIG. 7 illustrates a schematic diagram of an embodiment of a maximum compensation tracker module for multiple specific harmonic compensators (SHCs) according to the present disclosure.

Referring now to FIG. 7, a schematic diagram of an embodiment of multiple maximum compensation tracker (MCT) modules (e.g., MCT-1, MCT-2) for multiple specific harmonic compensators (SHCs) (e.g., SHC-1, SHC-2) according to the present disclosure is illustrated. Accordingly, as shown, in an embodiment, two or more MCTs can work simultaneously without interfacing with each other. For example, as shown, the maximum compensation tracker module described herein may be one of a plurality of maximum compensation tracker modules. As such, the method may include generating, via the plurality of maximum compensation tracker modules, a plurality of phase offset signals and applying the plurality of phase offset signals to the respective SHCs.

Referring now to FIG. 8, various graphs 400, 402, 404 of current in amperes, angle in degrees, and angle in radians to illustrate maximum compensation tracking for an active harmonic filter of an inverter-based resource according to the present disclosure are illustrated. In particular, graph 400 shows the amplitude of the current harmonic being targeted by the SHC. Graph 404 shows the output of the MCT, e.g., the phase angle introduced in order to achieve maximum compensation. Graph 402 shows the net phase shift (filtered) introduced by the control stage as a whole. Thus, the graphs 400, 402, 404 illustrate simulation output of the active harmonic filter with the MCT. As such, the tracking feature of the MCT can be observed from the graphs 400, 402, 404. In particular, for example, graph 400 shows the current settling as graphs 402 and 404 show the angle settling to its optimum value.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Further aspects are provided by the subject matter of the following clauses:

A method for controlling an active harmonic filter of an inverter-based resource, the method comprising: receiving, via a maximum compensation tracker module, a grid feedback signal; determining, via the maximum compensation tracker module, a phase shift signal based, at least in part, on the grid feedback signal; applying, via the maximum compensation tracker module, a phase shift offset signal to the phase shift signal to obtain a modified phase shift signal; determining, via the maximum compensation tracker module, a voltage reference signal for the active harmonic filter based, at least in part, on the grid feedback signal and the modified phase shift signal; and controlling, via the maximum compensation tracker module, the active harmonic filter using the voltage reference signal, wherein the phase shift offset signal ensures that the active harmonic filter injects a current substantially out of phase of a targeted harmonic.

The method of any preceding clause, wherein the grid feedback signal comprises at least one of voltage feedback, a current feedback, a frequency feedback, or combinations thereof.

The method of any preceding clause, further comprising: rotating the grid feedback signal from an abc reference frame to a dq reference frame to obtain a rotated dq feedback signal; and filtering the rotated dq feedback signal to obtain a filtered dq feedback signal.

The method of any preceding clause, wherein determining the voltage reference signal for the active harmonic filter based, at least in part, on the grid feedback signal and the modified phase shift signal further comprises: applying a gain to the filtered dq feedback signal to determine a dq voltage reference signal; and rotating the dq voltage reference signal from the dq reference frame back to the abc reference frame to obtain an abc voltage reference signal, the abc voltage reference signal being synonymous with the voltage reference signal.

The method of any preceding clause, wherein determining the phase shift signal based, at least in part, on the grid feedback signal further comprises: determining, via a proportional integral controller, an angular frequency based on an initial frequency signal and a d component of the filtered dq feedback signal; and integrating the angular frequency to obtain the phase shift signal.

The method of any preceding clause, further comprising determining, via the maximum compensation tracker module, an optimal value of the phase shift offset for maximum harmonic compensation per unit ampere for the active harmonic filter.

The method of any preceding clause, wherein determining the optimal value of the phase shift offset signal for maximum harmonic compensation per unit ampere for the active harmonic filter further comprises: setting a default value for the phase shift offset signal; disturbing the phase shift offset signal by an offset parameter; checking a harmonic compensation of the active harmonic filter using a discrete Fourier transform; if the harmonic compensation has improved, maintaining the phase shift offset signal at the default value; and if the harmonic compensation has not improved, incrementally changing the offset parameter by a certain amount to obtain a revised offset parameter, disturbing the phase shift offset signal by the revised offset parameter, and rechecking the harmonic compensation of the active harmonic filter.

The method of any preceding clause, wherein the maximum compensation tracker module is one of a plurality of maximum compensation tracker modules, the method further comprising: generating, via the plurality of maximum compensation tracker modules, a plurality of phase offset signals; and applying the plurality of phase offset signals to respective specific harmonic compensators.

The method of any preceding clause, wherein the inverter-based resource comprises a wind turbine power system.

The method of any preceding clause, further comprising coupling the active harmonic filter between a line-side converter of the wind turbine power system and an electrical grid.

A wind turbine power system connected to an electrical grid, the wind turbine power system comprising: a power converter comprising a rotor-side converter and a line-side converter; a generator comprising a rotor and a stator; an active harmonic filter coupled between the generator and the electrical grid; and a controller for controlling the wind turbine power system, the controller comprising a maximum compensation tracker module, the maximum compensation tracker module configured to perform a plurality of operations, the plurality of operations comprising: receiving a grid feedback signal; determining a phase shift signal based, at least in part, on the grid feedback signal; applying a phase shift offset signal to the phase shift signal to obtain a modified phase shift signal; determining a voltage reference signal for the active harmonic filter based, at least in part, on the grid feedback signal and the modified phase shift signal; and controlling the active harmonic filter using the voltage reference signal, wherein the phase shift offset signal ensures that the active harmonic filter injects a current substantially out of phase of a targeted harmonic.

The wind turbine power system of any preceding clause, wherein the grid feedback signal comprises at least one of voltage feedback, a current feedback, a frequency feedback, or combinations thereof.

The wind turbine power system of any preceding clause, wherein the plurality of operations further comprise: rotating the grid feedback signal from an abc reference frame to a dq reference frame to obtain a rotated dq feedback signal; and filtering the rotated dq feedback signal to obtain a filtered dq feedback signal.

The wind turbine power system of any preceding clause, wherein determining the voltage reference signal for the active harmonic filter based, at least in part, on the grid feedback signal and the modified phase shift signal further comprises: applying a gain to the filtered dq feedback signal to determine a dq voltage reference signal; and rotating the dq voltage reference signal from the dq reference frame back to the abc reference frame to obtain an abc voltage reference signal, the abc voltage reference signal being synonymous with the voltage reference signal.

The wind turbine power system of any preceding clause, wherein determining the phase shift signal based, at least in part, on the grid feedback signal further comprises: determining, via a proportional integral controller, an angular frequency based on an initial frequency signal and a d component of the filtered dq feedback signal; and integrating the angular frequency to obtain the phase shift signal.

The wind turbine power system of any preceding clause, wherein the plurality of operations further comprise: determining, via the maximum compensation tracker module, an optimal value of the phase shift offset for maximum harmonic compensation per unit ampere for the active harmonic filter.

The wind turbine power system of any preceding clause, wherein determining the optimal value of the phase shift offset signal for maximum harmonic compensation per unit ampere for the active harmonic filter further comprises: setting a default value for the phase shift offset signal; disturbing the phase shift offset signal by an offset parameter; checking a harmonic compensation of the active harmonic filter using a discrete Fourier transform; if the harmonic compensation has improved, maintaining the phase shift offset signal at the default value; and if the harmonic compensation has not improved, incrementally changing the offset parameter by a certain amount to obtain a revised offset parameter, disturbing the phase shift offset signal by the revised offset parameter, and rechecking the harmonic compensation of the active harmonic filter.

The wind turbine power system of any preceding clause, wherein the maximum compensation tracker module is one of a plurality of maximum compensation tracker modules, the method further comprising: generating, via the plurality of maximum compensation tracker modules, a plurality of phase offset signals; and applying the plurality of phase offset signals to respective specific harmonic compensators.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an active harmonic filter of an inverter-based resource, the method comprising:
   receiving, via a maximum compensation tracker module, a grid feedback signal;
   determining, via the maximum compensation tracker module, a phase shift signal based, at least in part, on the grid feedback signal;
   applying, via the maximum compensation tracker module, a phase shift offset signal to the phase shift signal to obtain a modified phase shift signal;
   determining, via the maximum compensation tracker module, a voltage reference signal for the active harmonic filter based, at least in part, on the grid feedback signal and the modified phase shift signal, wherein determining the voltage reference signal for the active harmonic filter based, at least in part, on the grid feedback signal and the modified phase shift signal further comprises:
      rotating the grid feedback signal from an abc reference frame to a dq reference frame to obtain a rotated dq feedback signal;
      filtering the rotated dq feedback signal to obtain a filtered dq feedback signal;
      applying a gain to the filtered dq feedback signal to determine a dq voltage reference signal;
      rotating the dq voltage reference signal from the dq reference frame back to the abc reference frame to obtain an abc voltage reference signal, the abc voltage reference signal being synonymous with the voltage reference signal; and
   controlling, via the maximum compensation tracker module, the active harmonic filter using the voltage reference signal, wherein the phase shift offset signal ensures that the active harmonic filter injects a current out of phase of a targeted harmonic.

2. The method of claim 1, wherein the grid feedback signal comprises at least one of voltage feedback, a current feedback, a frequency feedback, or combinations thereof.

3. The method of claim 1, wherein determining the phase shift signal based, at least in part, on the grid feedback signal further comprises:
   determining, via a proportional integral controller, an angular frequency based on an initial frequency signal and a d component of the filtered dq feedback signal; and
   integrating the angular frequency to obtain the phase shift signal.

4. The method of claim 1, further comprising determining, via the maximum compensation tracker module, an optimal value of the phase shift offset for maximum harmonic compensation per unit ampere for the active harmonic filter.

5. The method of claim 4, wherein determining the optimal value of the phase shift offset signal for maximum harmonic compensation per unit ampere for the active harmonic filter further comprises:
   setting a default value for the phase shift offset signal;
   disturbing the phase shift offset signal by an offset parameter;
   checking a harmonic compensation of the active harmonic filter using a discrete Fourier transform;
   if the harmonic compensation has improved, maintaining the phase shift offset signal at the default value; and
   if the harmonic compensation has not improved, incrementally changing the offset parameter by a certain amount to obtain a revised offset parameter, disturbing the phase shift offset signal by the revised offset parameter, and rechecking the harmonic compensation of the active harmonic filter.

6. The method of claim 1, wherein the maximum compensation tracker module is one of a plurality of maximum compensation tracker modules, the method further comprising:
   generating, via the plurality of maximum compensation tracker modules, a plurality of phase offset signals; and
   applying the plurality of phase offset signals to respective specific harmonic compensators.

7. The method of claim 6, further comprising coupling the active harmonic filter between a line-side converter of the wind turbine power system and an electrical grid.

8. The method of claim 1, wherein the inverter-based resource comprises a wind turbine power system.

9. A wind turbine power system connected to an electrical grid, the wind turbine power system comprising:
   a power converter comprising a rotor-side converter and a line-side converter;
   a generator comprising a rotor and a stator;
   an active harmonic filter coupled between the generator and the electrical grid; and
   a controller for controlling the wind turbine power system, the controller comprising a maximum compensation tracker module, the maximum compensation tracker module configured to perform a plurality of operations, the plurality of operations comprising:
      receiving a grid feedback signal;
      determining a phase shift signal based, at least in part, on the grid feedback signal;
      applying a phase shift offset signal to the phase shift signal to obtain a modified phase shift signal;
      determining a voltage reference signal for the active harmonic filter based, at least in part, on the grid feedback signal and the modified phase shift signal, wherein determining the voltage reference signal for the active harmonic filter based, at least in part, on the grid feedback signal and the modified phase shift signal further comprises:
         rotating the grid feedback signal from an abc reference frame to a dq reference frame to obtain a rotated dq feedback signal;
         filtering the rotated dq feedback signal to obtain a filtered dq feedback signal;
         applying a gain to the filtered dq feedback signal to determine a dq voltage reference signal;
         rotating the dq voltage reference signal from the dq reference frame back to the abc reference frame to obtain an abc voltage reference signal, the abc voltage reference signal being synonymous with the voltage reference signal; and controlling the active harmonic filter using the voltage reference signal, wherein the phase shift offset signal ensures that the active harmonic filter injects a current substantially out of phase of a targeted harmonic.

10. The wind turbine power system of claim 9, wherein the grid feedback signal comprises at least one of voltage feedback, a current feedback, a frequency feedback, or combinations thereof.

11. The wind turbine power system of claim 9, wherein determining the phase shift signal based, at least in part, on the grid feedback signal further comprises:
   determining, via a proportional integral controller, an angular frequency based on an initial frequency signal and a d component of the filtered dq feedback signal; and
   integrating the angular frequency to obtain the phase shift signal.

12. The wind turbine power system of claim 9, wherein the plurality of operations further comprise:
   determining, via the maximum compensation tracker module, an optimal value of the phase shift offset for maximum harmonic compensation per unit ampere for the active harmonic filter.

13. The wind turbine power system of claim 12, wherein determining the optimal value of the phase shift offset signal for maximum harmonic compensation per unit ampere for the active harmonic filter further comprises:
   setting a default value for the phase shift offset signal;
   disturbing the phase shift offset signal by an offset parameter;
   checking a harmonic compensation of the active harmonic filter using a discrete Fourier transform;
   if the harmonic compensation has improved, maintaining the phase shift offset signal at the default value; and
   if the harmonic compensation has not improved, incrementally changing the offset parameter by a certain amount to obtain a revised offset parameter, disturbing the phase shift offset signal by the revised offset parameter, and rechecking the harmonic compensation of the active harmonic filter.

14. The wind turbine power system of claim 9, wherein the maximum compensation tracker module is one of a plurality of maximum compensation tracker modules, the method further comprising:
   generating, via the plurality of maximum compensation tracker modules, a plurality of phase offset signals; and
   applying the plurality of phase offset signals to respective specific harmonic compensators.

\* \* \* \* \*